United States Patent
Haubenschild

(10) Patent No.: US 9,182,818 B2
(45) Date of Patent: Nov. 10, 2015

(54) COMMUNICATION SYSTEM OF A MOTOR VEHICLE

(71) Applicant: Frank Haubenschild, Wilnsdorf (DE)

(72) Inventor: Frank Haubenschild, Wilnsdorf (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/350,739

(22) PCT Filed: Oct. 9, 2012

(86) PCT No.: PCT/EP2012/069918
§ 371 (c)(1),
(2) Date: Apr. 9, 2014

(87) PCT Pub. No.: WO2013/053678
PCT Pub. Date: Apr. 18, 2013

(65) Prior Publication Data
US 2014/0257635 A1    Sep. 11, 2014

(30) Foreign Application Priority Data

Oct. 10, 2011    (DE) .................. 10 2011 084 217

(51) Int. Cl.
| | |
|---|---|
| *G06F 7/00* | (2006.01) |
| *G06F 3/01* | (2006.01) |
| *H04L 29/08* | (2006.01) |

(Continued)

(52) U.S. Cl.
CPC .............. *G06F 3/013* (2013.01); *B60K 35/00* (2013.01); *B60K 37/06* (2013.01); *G02B 27/0101* (2013.01); *H04L 67/14* (2013.01);

(Continued)

(58) Field of Classification Search
CPC ..................... G06F 3/013; G02B 27/0101
USPC ............... 701/36, 301, 117, 24; 359/630; 180/167; 340/902
See application file for complete search history.

(56) References Cited

U.S. PATENT DOCUMENTS

| | | |
|---|---|---|
| 6,675,075 B1 | 1/2004 | Engelsberg et al. |
| 8,180,297 B2 | 5/2012 | Hess et al. |

(Continued)

FOREIGN PATENT DOCUMENTS

| | | |
|---|---|---|
| DE | 19951001 A1 | 5/2001 |
| DE | 102007051079 A1 | 4/2008 |

(Continued)

OTHER PUBLICATIONS

2011Q01615 SW "Blickerfassung" aus Wikipedia, der freien Enzyklopädie.

(Continued)

*Primary Examiner* — Russell Frejd
*Assistant Examiner* — Luke Huynh
(74) *Attorney, Agent, or Firm* — Cozen O'Connor

(57) ABSTRACT

A communication system of a motor vehicle includes: a first image recording apparatus arranged in the motor vehicle and oriented toward a driver, a first evaluating module for determining a detected viewing direction of the driver from the image recorded by the first image recording apparatus, a determining unit that determines a point of intersection of the detected viewing direction and a windshield of the motor vehicle, and a projection device, connected to the determining unit, for projecting a marking onto the windshield. The position of the marking includes the point of intersection.

15 Claims, 1 Drawing Sheet

(51) Int. Cl.
    *B60K 35/00* (2006.01)
    *B60K 37/06* (2006.01)
    *G02B 27/01* (2006.01)

(52) U.S. Cl.
    CPC ... *G02B2027/014* (2013.01); *G02B 2027/0138* (2013.01); *G02B 2027/0187* (2013.01)

(56) References Cited

U.S. PATENT DOCUMENTS

| | | | |
|---|---|---|---|
| 8,680,978 B2 * | 3/2014 | Yang et al. | 340/435 |
| 2006/0238877 A1 * | 10/2006 | Ashkenazi et al. | 359/630 |
| 2010/0094501 A1 * | 4/2010 | Kwok | 701/36 |

FOREIGN PATENT DOCUMENTS

| | | |
|---|---|---|
| DE | 102007049710 A1 | 4/2009 |
| DE | 102008042539 A1 | 4/2010 |
| DE | 102009002979 A1 | 11/2010 |
| EP | 1284432 A1 | 2/2003 |

OTHER PUBLICATIONS

2011Q01616 US The world's first off-the-shelf, embedded eye tracking system for seamless integration Tobii Eye Tracker IS.

2011Q01622 US "See your products with new eyes" Tobii Eye Tracking.

* cited by examiner

COMMUNICATION SYSTEM OF A MOTOR VEHICLE

CROSS-REFERENCE TO RELATED APPLICATIONS

This is a U.S. national stage of application No. PCT/EP2012/069918, filed on 9 Oct. 2012 which claims priority to the German Application No. 10 2011 084 217.9, filed October 2011, the content of both incorporated herein by reference.

BACKGROUND OF THE INVENTION

1. Field of the Invention

The present invention relates to a communication system of a motor vehicle for vehicle-to-vehicle communication.

2. Related Art

Systems for communication from vehicle to vehicle are already known. Such systems which are also referred to as C2C or C2X systems. The communication is generally carried out via a short-range radio link in ad-hoc networks. These systems make it possible to transmit an item of information from one vehicle to a plurality of adjacent vehicles. The information may, for example, be a hazard message, a hazard being detected via sensors in a first vehicle and a corresponding hazard message being created and transmitted. Thus, it is possible, for example, to inform vehicles about slippery roads or a traffic jam. In addition, WO 2008/049868 A1 discloses a method for establishing a communication link with one or multiple vehicles in a targeted manner. Here, the link is established with the aid of telematics units in the respective vehicles. The link is established after entering a registration number of the vehicle to be called.

In addition, various information and assistance systems for vehicles are known.

In so-called head-up systems, important information for the driver is projected onto a windshield of a vehicle with the aid of a projection device. This information, for example, relates to the speed or to navigation information.

Furthermore, so-called night vision systems are known, in which the road course in front of the vehicle is monitored with the aid of an infrared camera or with the aid of radar, whereby persons or animals can be detected and a corresponding warning can be projected onto the windshield with the aid of the head-up display.

In addition, eye tracking systems are known, in which the eye movement of a person is detected with the aid of a camera and a viewing direction is determined.

SUMMARY OF THE INVENTION

An object of the present invention is to specify a communication system of a motor vehicle that allows a targeted communication with an object situated outside the vehicle in a simple manner.

An additional object of the present invention is to specify a method for establishing a vehicle-to-object communication, in which the object is easily selectable.

The object is achieved in accordance with aspects of the present invention via a communication system and a method having the features of the independent patent claims.

The communication system according to one aspect of the present invention has a first image acquisition device that is situated in the motor vehicle and oriented toward a driver. A first evaluation module for determining a detected viewing direction of the driver from the image acquired by the first image acquisition device is associated with the first image acquisition device. Furthermore, the communication system has a determining unit configured to determine a point of intersection of the detected viewing direction and a windshield of the motor vehicle.

The position of the driver in the motor vehicle is generally already predetermined by the corresponding seat and can be varied only within narrow limits by adjusting the seat. If necessary, the position of the driver may be determined even more precisely based on the image of the first image acquisition device. This relates in particular to the position of the eyes.

Based on the determined geometry of the motor vehicle, the position and the shape of a windshield are furthermore known. Using these known data, the detected viewing direction of the driver may be used to determine a point of intersection of the detected viewing direction and the windshield of the motor vehicle, typically in a manner carried out as a computer program.

Furthermore, the communication system has a projection device with which a marking may be projected onto the windshield. The projection device is in contact with the determining unit configured to determine the point of intersection. The marking on the windshield is now positioned such that it comprises the calculated point of intersection between the detected viewing direction of the driver and the windshield. Thus, if the driver looks through the windshield, for example at another vehicle, a marking is then projected onto the windshield that precisely marks this vehicle from the point of view of the driver using the aforementioned actions. In other words, the driver may select a particular object solely via his or her viewing direction, the selected object being marked from the viewpoint of the driver via the marking projected onto the windshield. It is thus possible to achieve high accuracy when selecting the relevant object.

The communication system furthermore has a confirmation device that is operable by the driver, with which the driver may confirm that the marked object is the desired receiver or communication partner. If a confirmation signal of the confirmation device is present, a signal may now be transmitted via a communication device to a receiver that is marked with the marking from the detected viewing direction of the driver. The communication system according to the present invention thus provides a simple and reliable selection of a communication partner.

The communication system may furthermore comprise a second image acquisition device that is situated in the motor vehicle and oriented toward a road course in front of the motor vehicle, and a second evaluation module for determining an object in the acquired image of the second image acquisition device that is situated outside the vehicle in the viewing direction of the driver, and second determining unit configured to determine this object as the marked receiver. Thus, the position of the marked receiver may be determined more precisely, and if necessary, data of the marked receiver may be extracted from the image.

The communication device may be an electromagnetic short-range radio device. This has the advantage that known vehicle-to-vehicle communication devices may be used.

Furthermore, the communication system may have unit configured to ascertain a reception address of the marked receiver. This has the advantage that the reception address of the marked receiver does not have to be known to the driver of the motor vehicle and also does not have to be manually entered by the driver.

Furthermore, such a communication system may have a unit configured to determine a position of the motor vehicle and a unit configured to ascertain the reception address based on a position specification and reception address received by the marked receiver. Thus, the motor vehicle's own position may be determined absolutely, for example, as a longitude and latitude. This is most easily possible via known satellite navigation. Thus, the position of the receiver relative to the motor vehicle may be determined from the received position specification of the marked receiver, so that the marked receiver may be distinguished from other objects likewise transmitting radio signals in the vicinity of the motor vehicle.

Thus, it is possible to reliably distinguish which radio signal is transmitted by the marked receiver. If this radio signal contains the reception address of the marked receiver, this address may be used directly for the establishment of communication. Thus, a communication connection between the motor vehicle and the marked receiver may be established in a particularly simple manner.

In an alternative exemplary embodiment, the reception address may be ascertained based on an extraction of an identifier of the marked receiver from the image acquired by the second image acquisition device. For example, a motor vehicle registration number may be ascertained from the recorded image, a reception address being clearly associated with this motor vehicle registration number for the establishment of contact. The reception address may be ascertained either directly from the registration number, or an allocation table between known motor vehicles and reception addresses is stored in the motor vehicle, or the reception address allocated to the registration number is queried at a control center. The manual input of a reception address is omitted in this specific embodiment as well.

In an additional specific embodiment, the communication device may also be designed as an optical short-range communication device. Here, for example, an optical transmitting unit is present in the motor vehicle in the form of a light-emitting diode that transmits modulated light that carries the transmission information.

In one particular specific embodiment, the communication device may be designed for the directional transmission of a signal at a solid angle that is changeable with respect to the longitudinal axis of the motor vehicle. In this specific embodiment, the optical transmitting unit thus has a fixed radiation angle and a radiation direction that is changeable with respect to the longitudinal axis of the motor vehicle. Thus, the optical transmitting unit may be oriented directly toward the selected object, and the information may be transmitted exclusively to this object. The knowledge of a reception address of the selected object is not required in this embodiment.

One method according to an aspect of the present invention for determining a communication partner in a vehicle-to-object communication has the following method steps:
  a viewing direction of a driver of the motor vehicle is detected,
  a point of intersection of the viewing direction of the driver with a windshield of the motor vehicle is determined,
  a marking is projected onto the windshield, wherein the position of the marking comprises the point of intersection, and
  an object outside the vehicle marked with the marking from the detected viewing direction of the driver is selected as a communication partner.

The marked object may be selected by the driver as a communication partner via a manual or voice-controlled confirmation device.

Additional advantageous embodiments are specified hereinbelow.

BRIEF DESCRIPTION OF THE DRAWINGS

The present invention is explained in greater detail below with the aid of the drawings and exemplary embodiments, in which.

DETAILED DESCRIPTION OF THE PRESENTLY PREFERRED EMBODIMENTS

Figure 1:
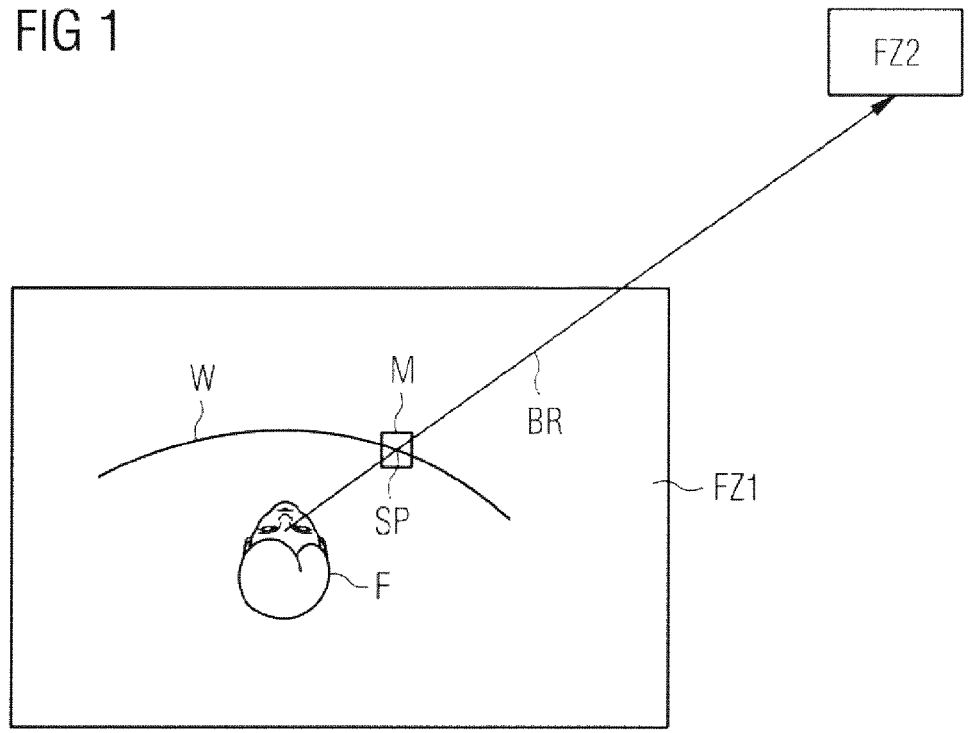
FIG. 1 shows a schematic representation explaining the identification of a marked object as a communication partner.

FIG. 1 shows a schematic representation explaining the detection of an object as a receiver. A motor vehicle FZ1 is controlled by a driver F, the viewing direction BR of the driver is detected, and when the position of the driver F and the windshield W of the vehicle FM are known, a point of intersection SP of the viewing direction BR of the driver F with the windshield W is determined from the detected viewing direction BR. An additional vehicle FZ2 is situated in the viewing direction BR of the driver F as a detected object. A marking M is projected onto the windshield W, which comprises the point of intersection SP. Thus, the additional vehicle FZ2 is marked by the marking M from the viewpoint of the driver F having the viewing direction BR. This marking M ensures that the object ascertained via the components of the communication system involved in the method, i.e., the vehicle FZ2, also matches the object desired by the driver F and selected as a communication partner via the viewing direction BR. This makes it possible to additionally increase the reliability of the system and to avoid an erroneous identification of a different object. If the object marked via the marking M matches the object desired as a communication partner, the driver then confirms this, after which a communication link is established to the desired communication partner. Thus, for example, it may be signaled to the vehicle FZ2 by the vehicle FZ1 that the driver F of the vehicle FZ1 relinquishes his or her priority and grants priority to the vehicle FZ2 that does not have priority per se. Such an intention to grant priority is customarily often given in road traffic using appropriate gestures or illuminated indications with the aid of the lighting system of the motor vehicle. However, these indications are not always clear and in particular also have different meanings in different countries. This existing uncertainty may be cleared up using the communication system according to the present invention and the method according to the present invention. In addition, the establishment of a communication connection to a selected object may, however, be carried out for other purposes.

Figure 2:
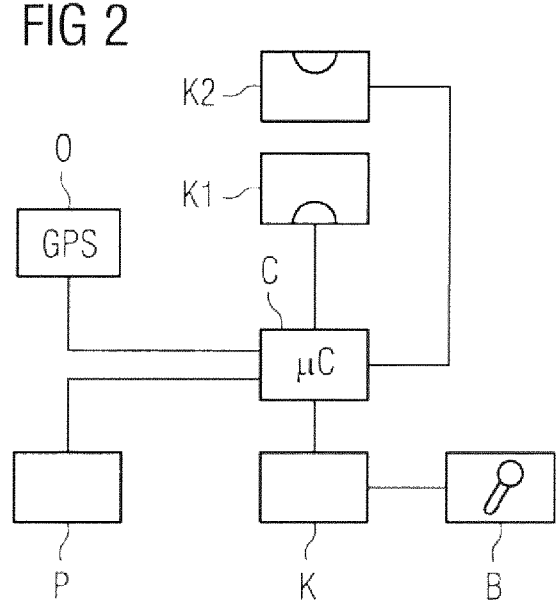
FIG. 2 shows a block diagram of the communication system.

FIG. 2 shows the individual components of the communication system and their interaction. The eye movement of the driver F is detected via a first image acquisition device K1 designed as a camera system. The first image acquisition device K1 is, for example, situated in a roof module in the vehicle and oriented toward the driver F. A viewing direction of the driver is determined with the aid of an appropriate computer program by a computing unit C, which may be designed as a microcomputer. The computing unit C ascertains a point of intersection of the viewing direction BR of the driver F with the windshield W from the detected viewing direction of the driver F, from the known position of the driver F, which may be determined more precisely if necessary based on the image of the first image acquisition device K1, and from the data about the geometrical arrangement of the windshield W, and forwards this information to the projection device P. The projection device P, which may be a head-up display that is known per se, now projects a marking at the point of intersection SP onto the windshield W. Using this marking M, an object (second vehicle FZ2) in the viewing direction BR of the driver F is thus marked via the marking M. The marking M may, for example, be formed as an arrow or a circle or a vehicle silhouette. In addition, the marking M may be also formed in conformity to known traffic signs. For example, the marking M may be formed as a yield sign having a question mark inside it, in order to give the driver F a cue as to whether he or she wants to grant the marked object priority.

The driver F confirms via a confirmation device B that he or she wants to communicate with the object that is selected and provided with the marking. The confirmation device B may, for example, be designed as a manual confirmation device having a corresponding operator control element or as a voice-controlled confirmation device. The confirmation device B is connected to the communication device K. If the communication device K receives a corresponding signal from the confirmation device B, the communication device K establishes a communication connection with the selected object, the communication data of which the communication device K receives from the computing unit C. The address of the object selected as the communication partner may generally be input by the driver F into the communication system. However, an automatic ascertainment of the communication address is more advantageous. Such an automatic ascertainment is explained below based on two embodiment variants.

According to the first exemplary embodiment variant, a second image acquisition device K2, also designed as a camera system, is provided with the computing unit C. The second image acquisition device K2 is oriented toward the road course in front of the vehicle FZ1. Objects that are situated directly or laterally in front of the vehicle FZ1 are thus detected via the second image acquisition device K2. Based on the detected viewing direction BR of the driver F and the image recorded by the second image acquisition device K2 of the surroundings in front of the vehicle FZ1, the computing unit C is able to determine which object from the recorded image of the second image acquisition device K2 lies in the viewing direction BR of the driver. Image recognition may then be used to identify a registration number of this object. Finally, a communication address of the detected object may be derived from the identified registration number. For this purpose, it is conceivable that the communication address may be derived directly from the identified registration number via a specified algorithm. Alternatively, allocations of registration numbers to communication addresses may also be stored in a memory unit of the computing unit C, whereby the associated communication address may be located based on the identified registration number. In addition, the registration number may also be used to query the communication address at a central station via a radio link. Finally, the desired information, which, for example, is provided via voice input, may be transmitted with the aid of the communication device K to the detected object. In this embodiment, a unidirectional design of the communication device is in principle sufficient.

In a second exemplary embodiment variant, the communication system also has an ordering module O, which preferably functions as a satellite navigation module. The position of the motor vehicle FZ1 itself may be determined absolutely with the aid of the ordering module O. The motor vehicle FZ2 that is detected as a selected object transmits its absolute position data and its communication address. Other vehicles are also equipped with corresponding systems and likewise transmit their position data and their communication addresses. Based on the detected position of the motor vehicle FZ1 itself and the transmitted position data of the motor vehicle FZ2 and the relative position between vehicles FZ1 and FZ2 that is determined based on the viewing direction BR, the vehicle FZ2 may be clearly determined as the desired communication partner. The communication address transmitted by the vehicle FZ2 is received by the communication system K of the vehicle FZ1 and is used as the communication address for establishing communication with the vehicle FZ2. In this variant as well, a communication address of the selected object is thus automatically ascertained. The vehicle FZ1 may in particular now also transmit its own communication address to the vehicle FZ2 and start a bidirectional communication.

Depending on the specific embodiment, the communication system may thus be designed either unidirectionally or bidirectionally. Here, the communication system is designed in particular as an electromagnetic short-range radio device.

In an additional exemplary embodiment variant, the communication system is designed as an optical communication system. Here, it may in particular also be designed as a unidirectional optical communication system, in which the information transmission takes place with the aid of a light-emitting lighting device modulated to the outside of the vehicle. The lighting device may in particular be an LED. The information to be transmitted is then contained in the light modulation. Using the optical communication device, a connection may also established with the selected object in a targeted manner if the radiation angle of the lighting device is sufficiently narrow and the radiation direction of the lighting device is variable. In this case, the radiation direction may be oriented directly toward the detected object. This embodiment has the advantage that a communication address of the detected object is not required.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A communication system of a motor vehicle (FZ1), the communication system comprising:
   a first image acquisition device (K1) situated in the motor vehicle (FZ1) and oriented toward a driver (F);
   a first evaluation module configured to determine a detected viewing direction (BR) of the driver from the image acquired by the first image acquisition device (K1);
   a first determining unit configured to determine a point of intersection (SP) of the detected viewing direction (BR) and a windshield (W) of the motor vehicle (FZ1);

a projection device (P) configured to project a marking (M) onto the windshield (W), the projection device being in contact with the first determining unit, wherein the position of the marking (M) comprises the point of intersection (SP);

a confirmation device (B) operable by the driver (F); and a communication device (K) configured to transmit a signal to a receiver outside of the motor vehicle (FZ1) that is marked with the marking (M) from the detected viewing direction (BR) of the driver (F), if a confirmation signal of the confirmation device (B) is present.

2. The communication system as claimed in claim 1, further comprising:

a second image acquisition device (K2) situated in the motor vehicle (FZ1) and oriented toward a road course in front of the motor vehicle (FZ1);

a second evaluation module configured to determine an object in the acquired image of the second image acquisition device (K2) that is situated outside the vehicle (FZ1) in the viewing direction (BR) of the driver (F); and a second determining unit configured to determine whether the object determined by the second evaluation unit is the marked receiver.

3. The communication system as claimed in claim 1, wherein the communication device (K) is an electromagnetic short-range radio device.

4. The communication system as claimed in claim 1, further comprising an ascertaining unit configured to ascertain a reception address of the marked receiver.

5. The communication system as claimed in claim 4, further comprising a third determining unit configured to determine a position of the motor vehicle, wherein the ascertaining unit ascertains the reception address based on a position specification and reception address received by the marked receiver.

6. The communication system as claimed in claim 1, wherein the communication device (K) is an optical short-range communication device.

7. The communication system as claimed in claim 6, wherein the optical communication system has a light-emitting lighting unit modulated to the outside of the vehicle.

8. A communication system of a motor vehicle (FZ1), the communication system comprising:

a first image acquisition device (K1) situated in the motor vehicle (FZ1) and oriented toward a driver (F);

a first evaluation module configured to determine a detected viewing direction (BR) of the driver from the image acquired by the first image acquisition device (K1);

a first determining unit configured to determine a point of intersection (SP) of the detected viewing direction (BR) and a windshield (W) of the motor vehicle (FZ1);

a projection device (P) configured to project a marking (M) onto the windshield (W), the projection device being in contact with the first determining unit, wherein the position of the marking (M) comprises the point of intersection (SP);

a confirmation device (B) operable by the driver (F);

a communication device (K) configured to transmit a signal to a receiver that is marked with the marking (M) from the detected viewing direction (BR) of the driver (F), if a confirmation signal of the confirmation device (B) is present; and an ascertaining unit configured to ascertain a reception address of the marked receiver, wherein the reception address is ascertained based on an extraction of an identifier of the marked receiver from the image acquired by the second image acquisition device (K2).

9. The communication system as claimed in claim 8, wherein the communication device is configured to transmit the signal in a spatial direction that is changeable with respect to a longitudinal axis of the motor vehicle (FZ1).

10. A method for determining a communication partner in a vehicle-to-object communication, the method comprising:

detecting a viewing direction (BR) of a driver of a motor vehicle (FZ1);

determining a point of intersection (SP) of the viewing direction of a driver (F) with a windshield (W) of the motor vehicle (FZ1);

projecting a marking (M) onto the windshield (W) such that the position of the marking (M) on the windshield comprises the point of intersection (SP); and selecting an object outside the vehicle (FZ1) marked with the marking (M) from the detected viewing direction (BR) of the driver (F) as a communication partner.

11. The method as claimed in claim 10, wherein the marked object is selected by the driver (F) as a communication partner via a manual or voice-controlled confirmation device (B).

12. A method for establishing a vehicle-to-object communication, in which the communication partner as claimed in claim 11 is determined, wherein a reception address transmitted by the marked object is received by the motor vehicle.

13. The method as claimed in claim 12, wherein a selection of the reception address of the marked object is made from a plurality of received reception addresses of objects by comparison of position data received by the marked object with the position data of the motor vehicle (FZ1) and the detected viewing direction (BR) of the driver.

14. A method for establishing a vehicle-to-object communication, in which the communication partner is determined as claimed in claim 11, wherein a reception address of the communication partner is ascertained by:

recording an image of the communication partner using an image acquisition device (K2); and extracting an identifier of the communication partner from the recorded image, wherein the identifier is the reception address, or the reception address is ascertained from the identifier.

15. The method as claimed in claim 10, wherein the object is a second motor vehicle (FZ2) having a receiving device.

* * * * *